May 30, 1939.  C. M. SLOMAN ET AL  2,160,040

RESILIENT MOUNTING

Filed Feb. 16, 1938  2 Sheets-Sheet 1

INVENTORS
CHERI M. SLOMAN
ROBERT A. MERRILL
BY
*Gourley & Bradley*
ATTORNEYS.

Patented May 30, 1939

2,160,040

UNITED STATES PATENT OFFICE 2,160,040

RESILIENT MOUNTING

Cheri M. Sloman and Robert A. Merrill, Detroit, Mich., assignors, by mesne assignments, to United States Rubber Company, New York, N. Y., a corporation of New Jersey Application February 16, 1938, Serial No. 190,704

4 Claims. (Cl. 248—358)

This invention relates to resilient mountings, and in particular to elastic rubber mountings having unusual physical properties, one of which is a pronounced increase in the fatigue life of the rubber stock. More particularly, the invention relates to rubber stock subjected to an initial stress within a predetermined range, in combination with the physical condition of subjecting the stock to repeated cycles of strain beyond the initial stress.

This invention broadly relates to a mounting construction including a base member, a vibrating member, and a body of rubber interposed therebetween, the initial tension and oscillating range of the body of rubber being considerably in excess of the normal dimensions of the body of rubber in the direction of the tension.

The use of rubber as a mounting for supporting machinery and for absorbing vibrations is rapidly increasing. For supporting loads, rubber is used under various stresses such as tension, compression, shear, and torsion.

The fatigue life of rubber subjected to repeated cycles of strain is dependent upon a number of factors, such as the amount it is stretched by the load it supports, and the amount it is further extended by the vibration of the load.

It has been discovered that certain fundamental physical properties of rubber may be profoundly changed by stressing the rubber in a simple manner to produce a novel product exhibiting valuable and unique properties.

It has been general practice in supporting loads, by mountings in which the rubber is in a state of tension, to limit the degree of tension as much as possible. For example, heretofore the most common applications of tension in commercial mountings do not exceed extension over 15 percent. In the present invention the degree of extension of the rubber due to the load and the range of extension resulting from vibration of the load greatly exceed the extensions which predominate in conventional practice.

Among the objects of the invention are to provide, a rubber mounting capable of withstanding an increased number of cycles of vibration, a rubber mounting less susceptible to deterioration, a rubber mounting capable of withstanding greater loads with less unit volume of rubber, and, a rubber mounting which, because of its decreased volume, may be manufactured more economically.

These and other objects and advantages will appear more fully in the following detailed description, when considered in connection with the accompanying drawings, in which.

Figure 1:
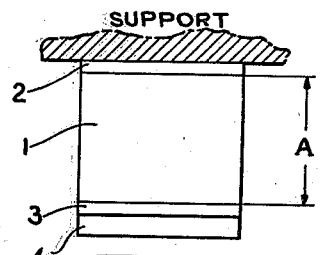
Fig. 1 is an elevational view of a rubber mounting previous to the application of a load.

With reference to the drawings, and in particular to Fig. 1, we show a mounting adaptable for supporting a load which places the mounting in a state of tension. For purposes of illustration, the mounting is of simplified construction, consisting essentially of a rubber body 1 bonded to metallic plates 2 and 3. The plate 2 may be attached to a support and the plate 3 may be attached to a vibrating member, indicated diagrammatically by the load 4. It is to be understood that the mounting may be modified to suit various conditions of supported loads, and that such modifications are contemplated within the scope of the invention in so far as it relates to a body of rubber supporting a vibrating member in such manner that the rubber body is subjected to strains in which tension predominates. The dimension A, as shown in Fig. 1, represents the length of the body of rubber 1 in its free state, that is, without supporting a load.

Figure 2:
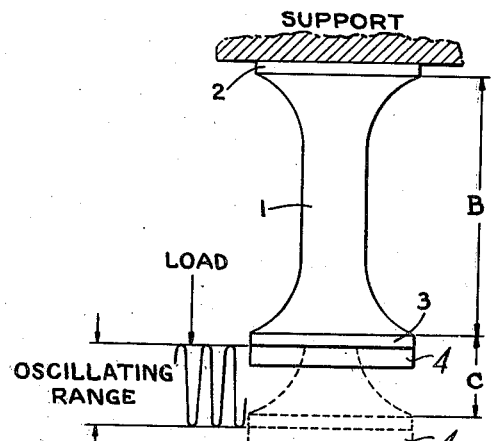
Fig. 2 is an elevational view of a rubber mounting subjected to a load in accordance with the practice of the invention.

In Fig. 2, a mounting is shown under load wherein B represents the length of the rubber body 1 under normal conditions imposed by the load 4, and C represents an additional extension of the length of the body of rubber 1 due to vibrations of the load which the mounting supports. More particularly, C represents the oscillating range of the mounting in excess of its normal load length.

In supporting loads by rubber bodies in a state of tension it has been the general practice to limit the degree of extension of the rubber body as much as possible, because of the belief that excessive extension would be detrimental to the life of the rubber mounting. For this reason, it has been considered general practice to limit the extension of the rubber mounting to 10 or 15 percent of its normal, unloaded length. By providing a mounting in which the body of rubber 1 is of such dimensions and characteristics as to permit extension of the rubber within definite ranges of elongation materially in excess of those heretofore used, we are able to produce a mounting having a longer fatigue life than a conventional mounting subjected to lighter loads or lesser degree of extension due to the applied load. By fatigue life of the rubber, we refer to the number of cycles necessary to break completely the rubber unit or to render the rubber body unfit as a load supporting medium.

Extensive research work has demonstrated that rubber under tension has a lower fatigue life when the rubber is subjected to slight degrees of extension, when compared with substantially higher degrees of elongation of the rubber body. This characteristic of rubber is shown in the graph, Fig. 3. In this graph the horizontal percentage values represent the degree of elongation of the rubber body, with reference to original length, as a result of the applied load in a static condition. The vertical percentage values with reference to the original length represent a range of oscillations in excess of the elongation produced by the static load. Each curved line on the graph represents the fatigue life of a conventional rubber stock utilized for tension mountings under a definite number of elongation cycles but under different conditions of elongation. The several curves collectively show the range of the cycles for the stock. The straight line D forming a hypotenuse on the graph indicates that the fatigue life of a body of rubber is equivalent to one-half of an oscillating cycle when subjected to an elongation of 600 per cent. The figures following each of the curved lines indicate the number of cycles of oscillations which represent the fatigue life of the rubber stock. The values indicated in the graph are based on normal atmospheric temperatures plus such increases in temperature which are due to hysteresis losses of the rubber composition.

An example of the manner in which the graph reads may be illustrated by the point X, wherein a rubber stock is subjected to a load equivalent to an elongation of 200 percent, as shown by the horizontal values, and the stock is subjected to an additional 200 percent elongation which indicates its oscillating range; that is, the rubber is vibrated back and forth between 200 percent and 400 percent elongation based on the original length. Under such a condition of extension and oscillation, a conventional rubber stock will withstand a number of cycles of oscillation in the order of 10,000,000. If, however, the initial elongation range is less than 75 percent, or is greater than 300 percent, the fatigue life of the rubber stock will be reduced to about 1,000,000 cycles. It is, therefore, apparent that excessive elongation of the stock within the ranges herein defined is of advantage in that fatigue life of the rubber is substantially increased.

The initial load 4 applied to the rubber stock is of considerable importance. It is evident, from the graph shown in Fig. 3, that desirable ranges of elongation of the rubber stock due to tension in the stock resulting from the applied load are in the order of from 100 percent to 300 percent. If a load applied to the rubber stock is such that the initial elongation ranges from 100 percent to 300 percent, a substantial improvement in fatigue life is obtained in various oscillating ranges, including elongations up to 300 percent beyond the elongations produced in the stock due to initial load. To illustrate this condition, and as shown by the graph, it may be assumed that a rubber stock is subjected to an initial load sufficient to elongate the stock to 200 percent of its normal length. If the oscillating range of this stock is approximately 100 percent in excess of the elongation resulting from the initial load, the fatigue life of the stock, as shown by the reference Y, is in excess of 100,000,000 cycles. If, however, the initial load is reduced so that the elongation of the stock is approximately 40 percent and the oscillating range remains at 100 percent, the fatigue life of the stock, as indicated by the reference Z, is reduced from 100,000,000 cycles to about 1,000,000 cycles.

From the foregoing it is apparent that the initial load as applied to rubber stocks is a principal factor toward increasing the fatigue life of the rubber stock.

The fatigue of the rubber stock will vary in accordance with different compositions of rubber. The present experiments illustrated in Fig. 3 have been conducted with a rubber stock suitable for mountings having a durometer hardness of about 50, and which in general is composed of ingredients as follows:

| | |
|---|---|
| Rubber | 64.88 |
| Antioxidant | .37 |
| Zinc oxide | 3.50 |
| Carbon black | 25.18 |
| Stearic acid | 1.00 |
| Pine tar | 2.50 |
| Retarder | .13 |
| Accelerator | .56 |
| Sulphur | 1.88 |
| | 100.00 |

Figure 4:
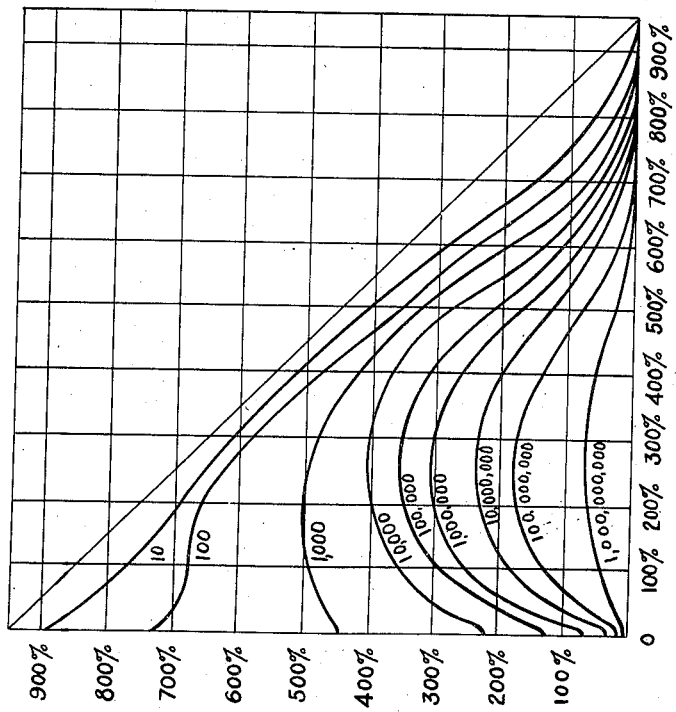
Fig. 4 is a graph similarly showing the fatigue life of a different rubber stock.

The graph of Fig. 4 illustrates the fatigue life of rubber stock having a durometer hardness of about 30, and the following composition:

| | |
|---|---|
| Rubber | 72.000 |
| Antioxidant | .500 |
| Zinc oxide | 5. |
| Carbon black | 4.125 |
| Light mineral oil | 11. |
| Pine tar | 4. |
| Stearic acid | .750 |
| Accelerator | .625 |
| Sulphur | 2. |
| | 100. |

Figure 5:
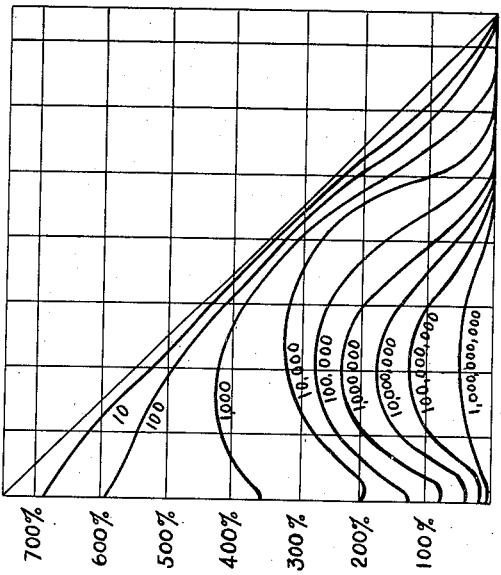
Fig. 5 is a graph similarly showing the fatigue life of another rubber stock.

The graph in Fig. 5 illustrates the fatigue life of another rubber stock having a durometer hardness of about 40 and the following composition:

| | |
|---|---|
| Rubber | 75.00 |
| Carbon black | 8.50 |
| Antioxidant | .37 |
| Zinc oxide | 4. |
| Magnesium carbonate | 4. |
| Stearic acid | .75 |
| Light mineral oil | 2. |
| Pine tar | 2.50 |
| Accelerator | .62 |
| Retarder | .13 |
| Sulphur | 2.13 |
| | 100. |

Figure 3:
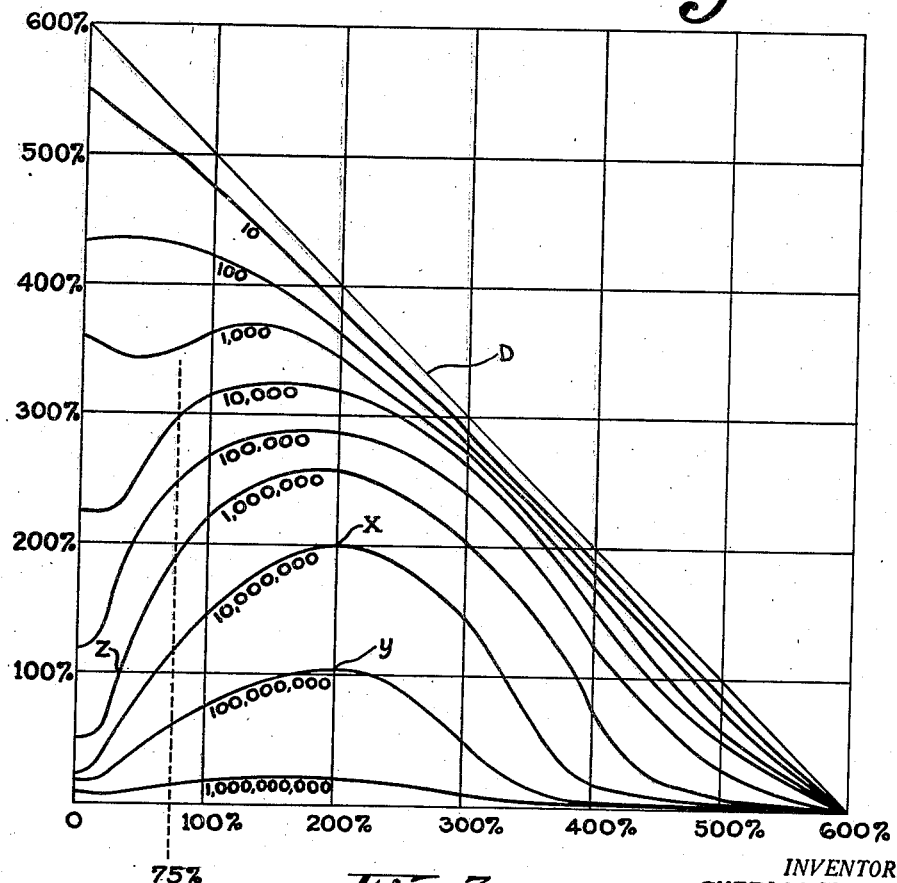
Fig. 3 is a graph showing the fatigue life of a rubber stock under various conditions of extension and oscillation ranges.

A comparison of the graphs of Figs. 3, 4, and 5 clearly shows that the rubber stocks suitable for such mountings and under initial elongation respond in substantially the same manner to the life tests.

While reference is made to increased loads applied to the rubber stock, it is obvious that the cross-sectional area of the stock may be reduced to suit the proper degree of elongation for a given load. Also, the characteristics of the stock may be changed to bring it within the desirable limitations of elongation.

One of the particular requirements of a rubber stock adaptable for functioning within the scope of the present invention is the capability of yielding or stretching to a proper degree upon the application of a definite load. This can be determined with reasonable accuracy in accordance with the durometer reading of the particular stock. It has been found that rubber stock of the foregoing general characteristics indicates durometer readings of from 30 to 50, and is suitable for application of the principles of the present invention.

The curved lines illustrated in the several graphs do not show critical limitations for proper elongation of the rubber stock. However, the ranges of limitations of practical importance and intended to be within the scope of invention lie between 75 percent and 300 percent elongation as a result of tension produced by the initial load. Within these ranges the fatigue life of the stock is dependent upon the additional elongation of the stock resulting from vibration of the supported member, the lesser degree of vibration the greater the fatigue life.

The invention as heretofore defined refers to a composition of natural rubber; however, the invention includes synthetic rubber such as neoprene or chloro-2 butadiene-1,3 polymer, in so far as such synthetic rubber compositions indicate the general physical characteristics of natural rubber composition.

Figure 6:
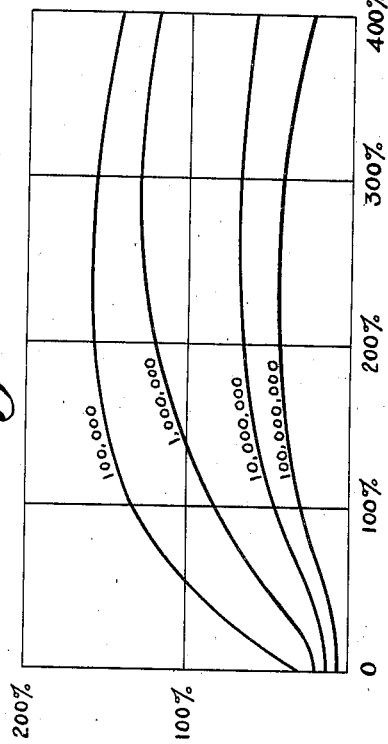
Fig. 6 is a graph showing the similarity of characteristics in the life cycle of neoprene as compared to that of rubber.

The graph in Fig. 6 clearly shows that the life cycles of neoprene follow the same general characteristics as the life cycles of the several rubber stocks heretofore discussed.

The term elastic as used in this specification and claims is intended to include both natural rubber and artificial rubber compositions having substantially the physical properties of rubber.

While we have shown and described a preferred embodiment of the invention, it is to be understood that it is susceptible to various modifications in which the rubber member is subjected to strains predominantly in tension, and it is intended to include such modifications within the scope of the invention as defined by the appended claims.

Having thus described our invention, what we claim and desire to protect by Letters Patent is:

1. A mounting construction comprising a supporting member, a vibrating member, and an interposed supporting body of organic elastic material of the nature of rubber attached thereto, the length of said body of elastic material when under static load being from 75 percent to 300 percent greater than its normal length, and the oscillating range of the body of elastic material being at least in part beyond its loaded length. said body of elastic material having a hardness in the order of from 30 to 50 durometer.

2. A mounting construction comprising a supporting member, a vibrating member, and an interposed supporting body of organic elastic material of the nature of rubber attached thereto, the length of said body of elastic material when under static load being from 12 percent to 50 percent of its elongation length at break, and the oscillating range of the body of elastic material being at least in part beyond its loaded length.

3. A mounting construction comprising a supporting member, a vibrating member, and an interposed supporting body of organic elastic material of the nature of rubber attached thereto and adaptable for supporting the vibrating member through tension of the rubber body, the length of said body of elastic material when under static load being from 12 percent to 50 percent of its elongation length at break, and the oscillating range of the body of elastic material being at least in part beyond its loaded length.

4. A mounting construction comprising a supporting member, a vibrating member, and an interposed supporting body of organic elastic material of the nature of rubber attached thereto and adaptable for supporting the vibrating member, the characteristics of the body of elastic material being such as to cause an elongation of the elastic material of from 12 percent to 50 percent of its elongation length at break due to the static load of the vibrating member, and the oscillating range of the body of rubber being at least in part beyond its loaded length.

CHERI M. SLOMAN.
ROBERT A. MERRILL.